(12) United States Patent
Mielenz

(10) Patent No.: US 10,380,892 B2
(45) Date of Patent: Aug. 13, 2019

(54) METHOD FOR RECOGNIZING MOVEMENTS OF OBJECTS IN A VEHICLE PARKING AREA

(71) Applicant: Robert Bosch GmbH, Stuttgart (DE)

(72) Inventor: Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/559,103

(22) PCT Filed: Mar. 1, 2016

(86) PCT No.: PCT/EP2016/054276
§ 371 (c)(1),
(2) Date: Sep. 18, 2017

(87) PCT Pub. No.: WO2016/155964
PCT Pub. Date: Oct. 6, 2016

(65) Prior Publication Data
US 2018/0247535 A1    Aug. 30, 2018

(30) Foreign Application Priority Data
Mar. 27, 2015 (DE) .................. 10 2015 205 634

(51) Int. Cl.
*G08G 1/14* (2006.01)
*B62D 15/02* (2006.01)
(Continued)

(52) U.S. Cl.
CPC ............ *G08G 1/143* (2013.01); *B60W 30/06* (2013.01); *B62D 15/0285* (2013.01);
(Continued)

(58) Field of Classification Search
CPC combination set(s) only.
See application file for complete search history.

(56) References Cited

U.S. PATENT DOCUMENTS

| 2013/0147954 A1 | 6/2013 | Song et al. |
| 2014/0036076 A1 | 2/2014 | Nerayoff et al. |

(Continued)

FOREIGN PATENT DOCUMENTS

| DE | 19904093 A1 | 8/2000 |
| DE | 102007002198 A1 | 7/2008 |

(Continued)

OTHER PUBLICATIONS

International Search Report dated Jun. 2, 2016, of the corresponding International Application PCT/EP2016/054276 filed Mar. 1, 2016.

*Primary Examiner* — Thomas G Black
*Assistant Examiner* — Ana D Thomas
(74) *Attorney, Agent, or Firm* — Norton Rose Fulbright US LLP; Gerard Messina

(57) ABSTRACT

A method for recognizing movements of objects in a parking area for vehicles by processing images acquired by at least one camera. At least two images acquired by a camera are compared in order to recognize the movements of an object, differences between the two images being evaluated. If it is recognized in this context that a movement of an object has ended, the position of the object is stored in a memory.

11 Claims, 3 Drawing Sheets

(51) Int. Cl.
*B60W 30/06* (2006.01)
*G06K 9/00* (2006.01)
*G08G 1/04* (2006.01)
*G06T 7/292* (2017.01)
*G06T 7/246* (2017.01)
*G05D 1/00* (2006.01)
*G08G 1/0968* (2006.01)

(52) U.S. Cl.
CPC ....... *G05D 1/0011* (2013.01); *G06K 9/00785* (2013.01); *G06K 9/00805* (2013.01); *G06K 9/00812* (2013.01); *G06T 7/248* (2017.01); *G06T 7/292* (2017.01); *G08G 1/04* (2013.01); *G08G 1/096811* (2013.01); *G08G 1/146* (2013.01); *G06T 2207/30241* (2013.01); *G06T 2207/30261* (2013.01); *G06T 2207/30264* (2013.01)

(56) References Cited

U.S. PATENT DOCUMENTS

| | | | |
|---|---|---|---|
| 2014/0335897 A1* | 11/2014 | Clem | G08G 1/0112 455/456.3 |
| 2014/0372185 A1 | 12/2014 | Ganot | |
| 2015/0043779 A1* | 2/2015 | Huntzicker | B60Q 9/008 382/104 |
| 2017/0200367 A1* | 7/2017 | Mielenz | B60W 30/06 |

FOREIGN PATENT DOCUMENTS

| | | |
|---|---|---|
| DE | 102013205810 A1 | 12/2013 |
| DE | 102012222562 A1 | 6/2014 |
| EP | 2521070 A2 | 11/2012 |
| GB | 2502687 A | 12/2013 |

* cited by examiner

METHOD FOR RECOGNIZING MOVEMENTS OF OBJECTS IN A VEHICLE PARKING AREA

FIELD

The present invention relates to a method for recognizing movements of objects in a parking area for vehicles, to an apparatus for recognizing movements of objects in a parking area, and to a vehicle having an apparatus for automated execution of at least one driving function.

BACKGROUND INFORMATION

German Patent Application No. DE 10 2007 002 198 A1 describes a method in which the location of a motor vehicle is ascertained by video image-based object tracking. The location of the vehicle is then stored in a database.

SUMMARY

An object of the present invention is to improve the method for recognizing movements of objects in a parking area for vehicles.

This object may be achieved in accordance with the present invention, wherein at least two images acquired by a camera are compared in order to recognize the movements of an object, the differences between the two images being evaluated. If the two images are different, a movement of an object has taken place. By comparing further images, the movement of an object in the entire parking area can be tracked. If two images for a tracked object no longer show any difference, it follows therefrom that the object has not moved further. The movement of the object has therefore ended. If the movement of an object ends at a location, that location is stored in a memory.

The example method can be executed with the aid of an apparatus which encompasses at least one camera, at least one memory, and at least one data processing device.

A vehicle in accordance with the present invention is advantageous for executing the example method.

Various refinements are described herein.

In an example embodiment, an entrance region for objects is provided, through which region the objects can walk or drive into the parking area for vehicles. "Objects" in this context can be both vehicles and pedestrians. The entrance regions are specifically monitored by cameras, and movements are tracked starting from the entrance regions. Movements of objects can be effectively detected by comparing the acquired images and evaluating the differences. It is disadvantageous that, for example, changes in light conditions can cause the images acquired by the camera to differ even though no movement has taken place. Thanks to the specific monitoring of the entrance regions it is possible to track all objects in the parking area and to determine the positions of the objects. It is thereby possible, upon a change in light conditions, to rule out a movement if no object is stored at that point.

In a further embodiment, parking spaces, i.e., the areas provided for parking vehicles, are defined as occupied if the movement of an object has ended at the corresponding parking space.

In a further embodiment, parking spaces are defined as vacant if no movement of an object has ended at them or if, once a movement of an object has ended at a parking space, that object moves on again from that parking space.

In a further embodiment, information regarding vacant or occupied parking spaces can be forwarded to vehicles. The search for a vacant parking space in the parking area can thereby be simplified. It is possible both to indicate to the driver where in the parking area further vacant parking spaces are available, and to indicate paths to those parking spaces for vehicles that can drive autonomously.

In a further embodiment, information regarding travelable trajectories is forwarded to a vehicle. This makes it possible to forward the information regarding the shortest clear path for a vehicle to a parking space. Unnecessary driving in the parking area can thereby be avoided.

In a further exemplifying embodiment, a clear trajectory to a vacant parking space is assigned to a vehicle. If the vehicle is equipped with an apparatus for automatic execution of at least one driving function, the vehicle can use the assigned trajectory to arrive at the vacant parking space. Automation of the parking process can thereby be achieved.

In a further embodiment, by comparing the images acquired by a camera it is possible to recognize whether the vehicle is moving along the assigned trajectory. If the vehicle departs from the assigned trajectory, a notification is outputted to the vehicle. A vehicle having an apparatus for automated execution of a driving function can thereby be informed that it is deviating from the predefined trajectory. The apparatus for automated execution of at least one driving function can correspondingly correct the automated execution. In addition, if greater deviations exist the vehicle can also be assigned a new trajectory to which the vehicle then adheres. In other words, this can mean that the vehicle is controlled externally.

The object is achieved with an apparatus that encompasses at least one camera, at least one data processing device, and at least one memory. The images acquired by the camera are analyzed in the data processing device. If two successive images differ, this is recognized as a movement of an object in the parking area. The location at which a movement ends is stored in the memory. The location in the parking area at which the object is located is thereby known. If the object is no longer moving, two successive images no longer differ. The stored location is still known, however. The individual method steps of the embodiments can be stored in the data processing device by way of a program.

In a further embodiment, the apparatus is equipped with a transmitter that is configured so that information regarding vacant or occupied parking spaces can be forwarded to a vehicle.

In a further embodiment, trajectories for a vehicle can be specified by the data processing device, and those trajectories can likewise be forwarded to a vehicle with the aid of the transmitter.

The object may be achieved in according with the present invention by providing a vehicle having an apparatus for automated execution of at least one driving function, and a receiver. The receiver is configured in such a way that by way of it, information regarding vacant or occupied parking spaces can be received. The apparatus for automated execution of at least one driving function is configured in such a way that vacant parking spaces can be approached automatically.

In a further embodiment, the vehicle is configured in such a way that it can receive a trajectory. The apparatus for automated execution of at least one driving function then follows the received trajectory to a vacant parking space.

Exemplifying embodiments of the present invention are explained below with reference to the figures. The exemplifying embodiments refer respectively to parking areas for vehicles on one level. The present invention can likewise be used, however, for a parking area having several levels. Utilization for a parking area having several levels does not depart from the scope of protection of the invention.

DETAILED DESCRIPTION OF EXAMPLE EMBODIMENTS

Figure 1:
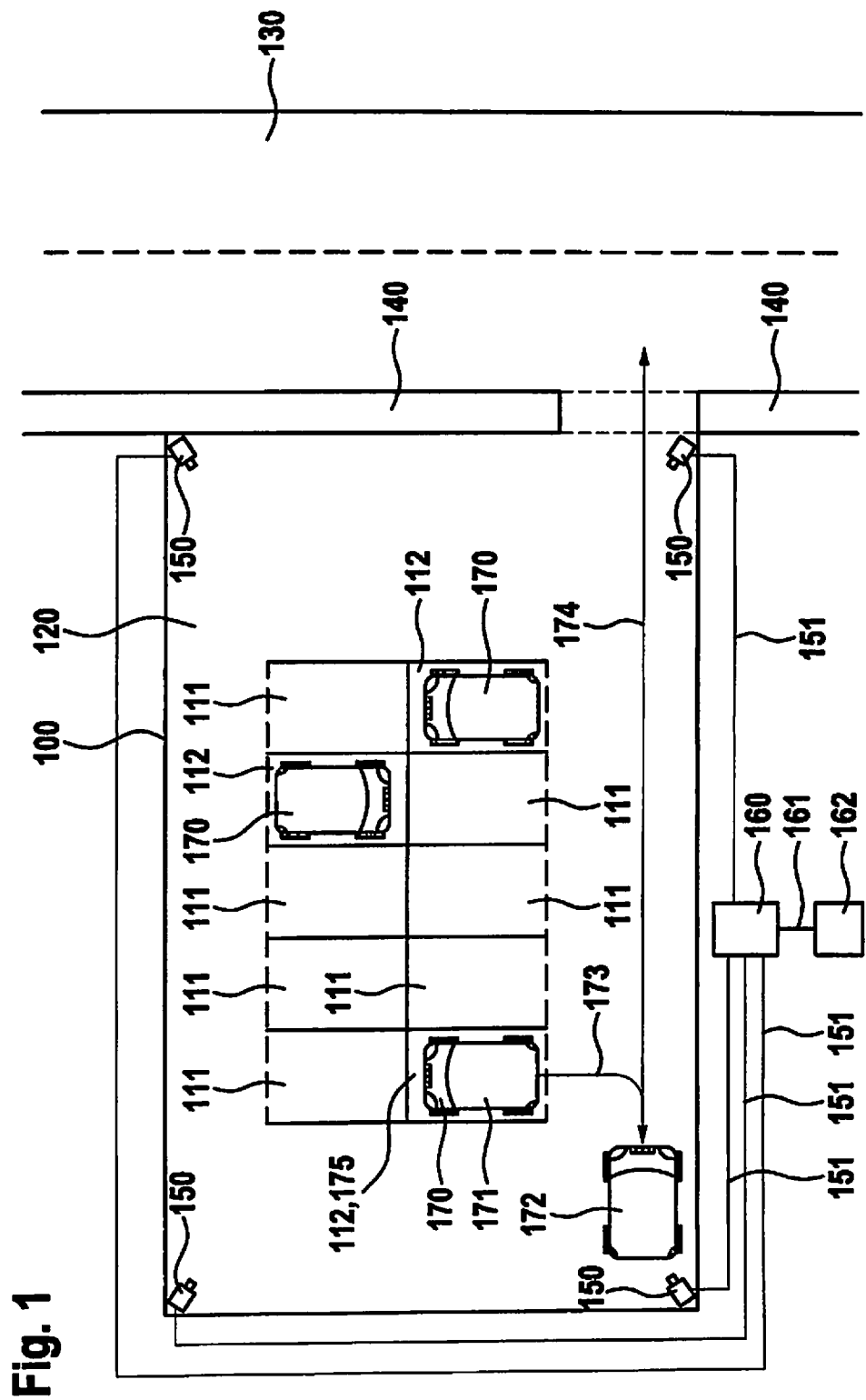
FIG. 1 shows a parking area with the movement of a vehicle.

FIG. 1 shows a parking area 100 for vehicles 170, 171. In this parking area 100 are parking spaces 111, 112, a distinction being made between vacant parking spaces 111 and occupied parking spaces 112. In addition to parking spaces 111, 112, the parking area is also made up of driving paths 120. Driving paths 120 are configured so that vehicles can arrive at parking spaces 111, 112 via driving paths 120. A street 130 is depicted next to parking area 100. A sidewalk 140 is also depicted. Vehicles 170, 171 can drive from street 130 into parking area 100. Pedestrians can walk into parking area 100 from sidewalk 140. Four cameras 150 are directed toward the parking area. Each camera 150 is connected via a lead 151 to a data processing device 160. Data processing device 160 is in turn connected via a further lead 161 to a memory 162. Data processing device 160 compares the images acquired by cameras 150, and movements of objects can be detected by the fact that the images acquired by cameras 150 change. Cameras 150 furthermore sense reference objects, for example walls, edges of the parking area, lines in the parking area, or columns, in order to determine the absolute position of the objects. Various objects (vehicles, pedestrians, but also animals) differ in that differently sized regions of the images acquired by the camera are different when the images are compared, since larger objects encompass a larger region of the image. Three vehicles 170 are parked in three parking spaces 112. A first vehicle 171 is moving from a first parking space 175 to a second position 172. This movement along a line 173 can be recognized by comparing images acquired by at least one camera 150. If first vehicle 171 remains stationary at second position 172, the images acquired by cameras 150 no longer change. Second position 172 is then stored in the memory as the location at which the vehicle is stationary. If first vehicle 171 then moves again it is possible to recognize, by comparing the images acquired by at least one camera 150, that a second movement of first vehicle 171 is taking place. First vehicle 171 moves along a second line 174 out of parking area 100. Because the movement of an object has begun for first parking space 175, that parking space is stored in memory 162 as vacant.

In an exemplifying embodiment, one camera 150 is directed onto parking area 100 for vehicles, and the movements of objects are recognized by comparing the images acquired by that one camera.

Figure 2:
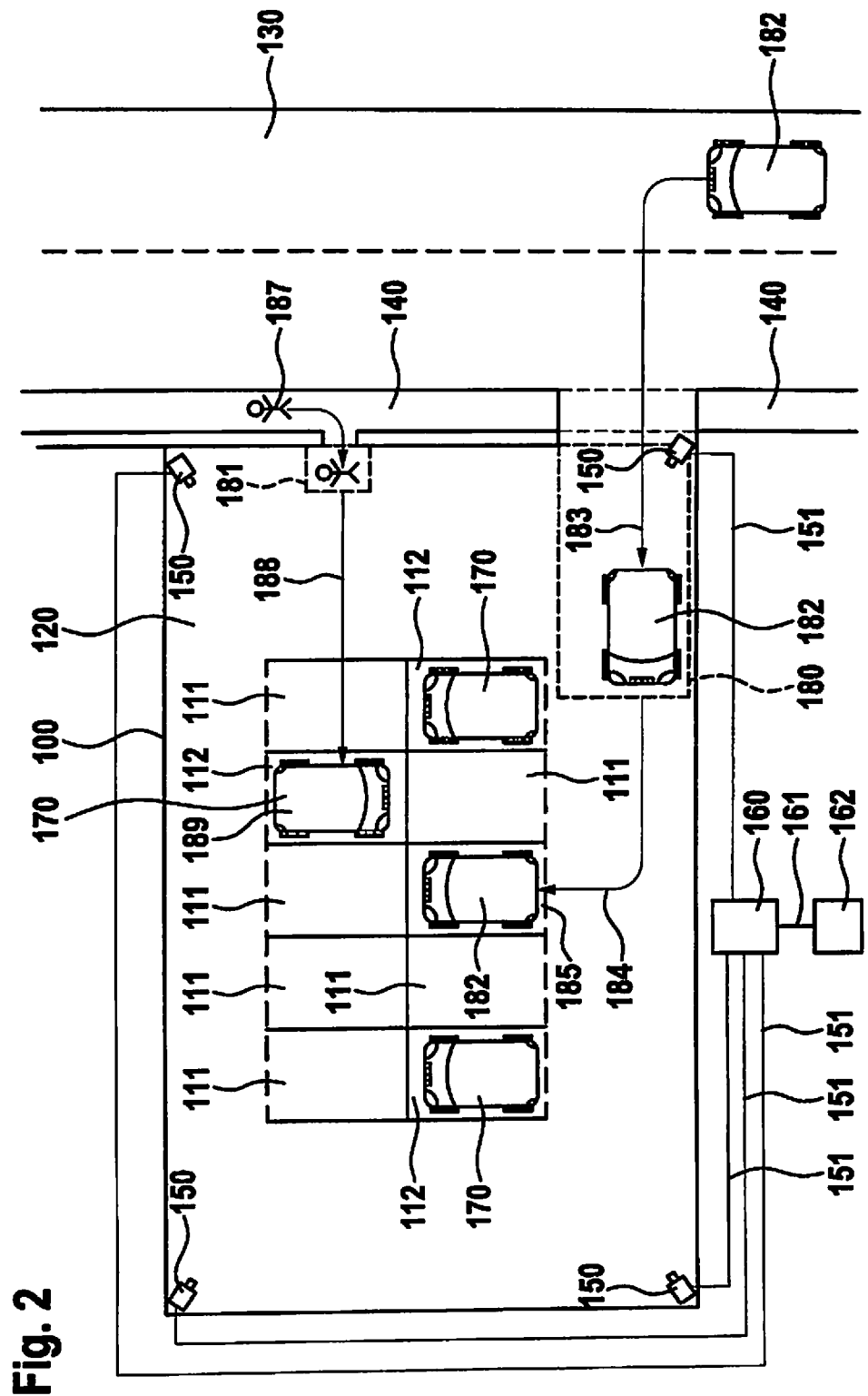
FIG. 2 shows a parking area in which objects arrive in the parking area via an entrance region.

FIG. 2 shows the same parking area 100 for vehicles, this time an entrance region 180 for vehicles and an entrance region 181 for pedestrians being provided. A second vehicle 182, which is turning from street 130 into parking area 100 on trajectory 183, is detected in entrance region 180. This is accomplished by comparing images acquired by at least one camera 150 that is directed onto entrance region 180. From there, the movement of second vehicle 182 on trajectory 184 to a vacant second parking space 185 is tracked. The movement of second vehicle 182 has ended at second parking space 185, so that second parking space 185 is stored in memory 162 as occupied.

A pedestrian 187 walks into the parking area via entrance region 181 for pedestrians, and moves on path 188 to a third vehicle 189. While pedestrian 187 is moving to third vehicle 189, the movement of pedestrian 187 is tracked by at least one camera 150.

Figure 3:
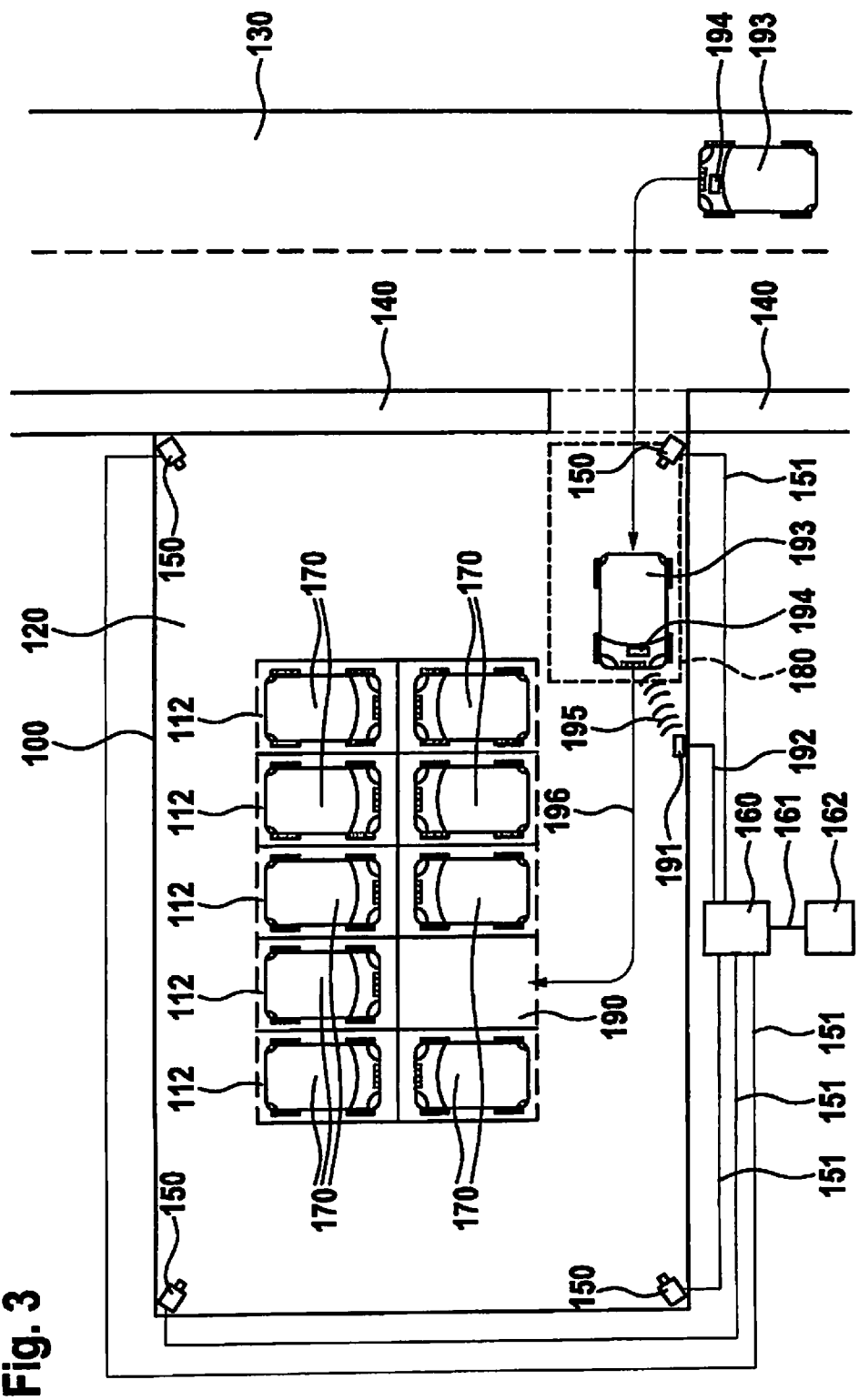
FIG. 3 shows a parking area that is configured in such a way that a clear trajectory to a vacant parking space can be conveyed to a vehicle.

FIG. 3 shows a parking area 100 for vehicles in which all parking spaces 112, except for a third parking space 190, are occupied by parked vehicles 170. In addition, data processing device 160 is equipped with a transmitter 191 and with a data connection 192 from data processing device 160 to transmitter 191. A fourth vehicle 193, having an apparatus for automatic execution of at least one driving function and having a receiver 194, turns from street 130 into parking area 100. "Automatic execution of at least one driving function" means in this context that the vehicle is equipped to automatically steer, accelerate, brake, or maintain speed, or to execute any combination of the driving functions. When the vehicle at entrance region 180 for vehicles is recognized, data processing device 160 assigns to the vehicle, by radio transmission 195, a clear trajectory 196 to a vacant parking space 190. Clear trajectory 196, i.e. a path from entrance region 180 to third parking space 190, is calculated on the basis of the vacant parking spaces 111 and clear driving paths 120 recognized by a camera 150. All spaces for which memory 162 has stored the fact that the movement of an object has ended there are excluded from the determination of clear trajectory 196, so that no obstacles (stationary objects) are present in clear trajectory 196. The vehicle having the apparatus for automated execution of at least one driving function then follows that trajectory 196 to vacant parking space 190. Once fourth vehicle 193 has arrived at parking space 190, this fact is recognized with the aid of images acquired by cameras 150, and parking space 190 is stored in memory 162 as occupied.

In a further exemplifying embodiment, information regarding vacant or occupied parking spaces can be forwarded to a vehicle. For this, a data connection 195 to a receiver 194 is established by way of transmitter 191. This can be effected even if the vehicle does not possess an apparatus for automated execution of a driving function. The information regarding vacant parking spaces can then help the driver travel quickly toward a vacant parking space in the parking area.

In a further exemplifying embodiment, a comparison of images acquired by at least one camera results in recognition as to whether a vehicle is moving on the trajectory assigned to the vehicle, or has departed from it. If a vehicle departs from the assigned trajectory, a notification is outputted to the vehicle by transmitter 191. As a result, the vehicle is capable of recognizing that it is not moving along the assigned trajectory. The apparatus for automated execution of the driving function can then intervene in controlling fashion and select a driving path that brings the vehicle back to the assigned trajectory. Alternatively, a new trajectory can be assigned to the vehicle, which trajectory the vehicle then follows.

In an exemplifying embodiment, the apparatus having a data processing device, a memory, and a transmitter is configured to be capable of forwarding information regarding vacant or occupied parking spaces to a vehicle.

In a further exemplifying embodiment, the apparatus having a data processing device, a memory, and a transmitter is configured so that the apparatus can specify a trajectory for a vehicle and assign it to a vehicle. That trajectory is then forwarded to the vehicle. In a further exemplifying embodiment, a vehicle having an apparatus for automated execution of at least one driving function is configured so that it can receive a trajectory assigned by the apparatus, and follow it.

What is claimed is:

1. A method for recognizing movements of objects in a parking area for vehicles by processing images acquired by at least one camera, the parking area including an entrance region for the objects, the objects including at least one of vehicles and/or pedestrians, the method comprising:
    monitoring the entrance region with at least one of the cameras;
    comparing at least two images to recognize a movement of at least one object wherein the at least one object includes one of the vehicles and/or the at least one pedestrian;
    evaluating differences between the images;
    recognizing if the at least one object has arrived via the entrance region based on comparing the images acquired by the at least one of the cameras; and
    storing, upon recognition of the completion of the movement, a position of the object in a memory.

2. The method as recited in claim 1, wherein parking spaces of the parking area, for which the memory has stored in it that the movement of the object has ended at such locations, are defined as occupied.

3. The method as recited in claim 2, wherein parking spaces of the parking area, for which the memory has stored in it that no movement of an object has ended at such locations, are defined as vacant.

4. The method as recited in claim 3, wherein information regarding the vacant or occupied parking spaces are forwarded to a vehicle.

5. The method as recited in claim 3, wherein information regarding travelable trajectories to vacant parking spaces is forwarded to a vehicle.

6. The method as recited in claim 5, wherein a trajectory in the parking area is assigned to the vehicle.

7. The method as recited in claim 6, further comprising
    recognizing, by comparison of the images acquired by a camera, whether the vehicle is moving along the assigned trajectory; and
    conveying a notification to the vehicle when the vehicle departs from the assigned trajectory.

8. A parking apparatus, comprising:
    at least one camera;
    at least one data processing device; and
    at least one memory;
    wherein the at least one data processing device is configured to recognize movements of objects in a parking area for vehicles by processing images acquired by the at least one camera, the parking area including an entrance region for the objects, the objects including at least one of vehicles and/or pedestrians, and wherein the data processing device is configured to perform the following:
        monitoring the entrance region with at least one of the at least one camera;
        comparing at least two images to recognize a movement of at least one object, wherein the at least one object includes one of the vehicles and/or the at least one pedestrian;
        evaluating differences between the images;
        recognizing if the at least one object has arrived via the entrance region based on comparing the images acquired by the at least one of the cameras; and
        storing, upon recognition of the completion of the movement, a position of the object in a memory.

9. The apparatus as recited in claim 8, further comprising:
    a transmitter configured so that information regarding vacant or occupied parking spaces is forwardable to a vehicle.

10. The apparatus as recited in claim 8, wherein the data processing device is configured to specify a trajectory for a vehicle, further comprising:
    a transmitter to forward to the vehicle the trajectory specified by the data processing device.

11. A vehicle, comprising:
    an automatic driving apparatus for automatically executing at least one driving function; and
    a receiver to receive information regarding a vacant or an occupied parking space;
    wherein the apparatus for automatically executing at least one driving function is configured to cause the vehicle to approach the vacant parking space based on the received information,
    wherein the receiver is configured to receive a trajectory for the vehicle, the vehicle being controlled along the received trajectory by the apparatus, and
    wherein the information is received from a parking apparatus, the parking apparatus including:
        at least one camera;
        at least one data processing device; and
        at least one memory;
        wherein the at least one data processing device is configured for recognizing movements of objects in a parking area for vehicles by processing images acquired by the at least one camera, the parking area including an entrance region for the objects, the objects including at least one of vehicles and/or pedestrians, and wherein the data processing device is configured to perform the following:
            monitoring the entrance region with at least one of the at least one camera;
            comparing at least two images to recognize a movement of at least one object, wherein the at least one object includes one of the vehicles and/or the at least one pedestrian;
            evaluating differences between the images;
            recognizing if the at least one object has arrived via the entrance region based on comparing the images acquired by the at least one of the cameras; and
            storing, upon recognition of the completion of the movement, a position of the object in a memory.

* * * * *